United States Patent
Schweizer et al.

(10) Patent No.: US 7,860,629 B2
(45) Date of Patent: Dec. 28, 2010

(54) METHOD FOR CONTROLLING A MOTOR VEHICLE DRIVETRAIN SYSTEM

(75) Inventors: Alexander Schweizer, Walzbachtal-Joehlingen (DE); Burkhard Pollak, Achern (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1868 days.

(21) Appl. No.: 10/711,404

(22) Filed: Sep. 16, 2004

(65) Prior Publication Data

US 2005/0075773 A1 Apr. 7, 2005

(30) Foreign Application Priority Data

Sep. 19, 2003 (DE) ................. 103 43 309

(51) Int. Cl.
*G05D 17/00* (2006.01)
(52) U.S. Cl. ........................ 701/51; 180/197
(58) Field of Classification Search ............. 701/51–54; 123/349–352, 436; 477/70–75, 156, 163, 477/164, 166; 180/197, 248–249
See application file for complete search history.

(56) References Cited

U.S. PATENT DOCUMENTS

| | | | |
|---|---|---|---|
| 5,052,246 A * | 10/1991 | Yamaguchi | 477/155 |
| 5,216,938 A | 6/1993 | Yamaguchi | |
| 6,357,419 B1 * | 3/2002 | Langer et al. | 123/443 |
| 6,456,917 B1 | 9/2002 | Gierling et al. | |
| 7,115,067 B2 * | 10/2006 | Tashiro | 477/83 |
| 2001/0039232 A1 | 11/2001 | Ehrmaier et al. | |

FOREIGN PATENT DOCUMENTS

GB 2315132 A 1/1998

* cited by examiner

*Primary Examiner*—Dalena Tran
(74) *Attorney, Agent, or Firm*—Simpson & Simpson, PLLC

(57) ABSTRACT

This invention relates to a method for controlling a motor vehicle drivetrain system which has a drivetrain as well as a combustion engine for driving this drivetrain and an electronic engine control unit as well as an electronic transmission control unit, whereby, if the electronic transmission control unit fails or when the electronic engine control unit loses communication with the electronic transmission control unit, the permissible engine torque of the combustion engine is limited, as well as a safety system for a motor vehicle by means of which the method is controlled, as well as a motor vehicle with such a safety system.

8 Claims, 2 Drawing Sheets

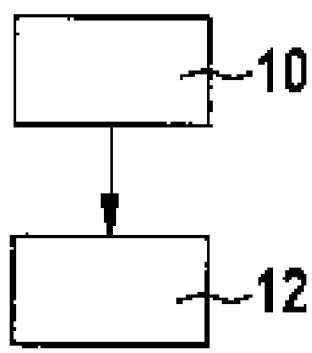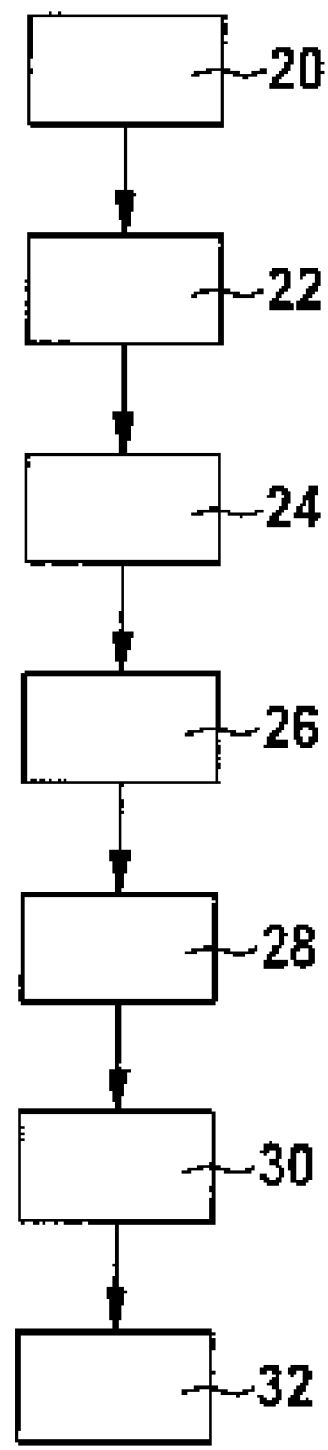

METHOD FOR CONTROLLING A MOTOR VEHICLE DRIVETRAIN SYSTEM

CROSS-REFERENCE TO RELATED APPLICATION

This patent claims priority of German Patent Application 103 43 309.0, filed Sep. 19, 2003, which application is incorporated herein by reference.

FIELD OF THE INVENTION

This invention relates to a method for controlling a motor vehicle drivetrain system.

BACKGROUND OF THE INVENTION

A communication or data communication or signal communication is required between an electronic engine control unit and an electronic transmission control unit in modern motor vehicles with an automated transmission system such as, for example, an automated shift transmission (ASG) or parallel shift transmission (PSG).

Critical situations may develop in these systems, especially with regard to safety. This happens, for example, in case of a total failure of the electronic transmission control unit, which, for example, can be caused by a processor failure.

One measure that is known—at least in-house in the applicant's establishment—in order to prevent or reduce the occurrence of situations that are critical in terms of safety or behavior forms that are critical in terms of safety in such situations consists in using a redundant processor. Such a system, for example, can be a so-called ISM (Integrated Safety Monitoring System). A second processor or redundant processor is provided here and it, for example, has a lesser capacity when compared to the main processor. The redundant processor and the main processor monitor each other, the system being shut off if one of these processors determines a problem with respect to the other processor. Shutting the system off in this kind of design, as a rule, results in a situation where all gear and clutch actors or actuation systems are frozen specifically in their particular current position. This strategy might possibly be considered a good compromise for at least many situations. In this strategy, one assumes that when the starting clutch is engaged during the freezing phase and when the gear is engaged in the gearbox device, the driver always has the possibility of braking or stopping the vehicle with a brake, in particular, service brake; furthermore, in this strategy, one starts with the assumption that when the clutch device is disengaged during the freezing phase, the vehicle can also be braked or brought to a stop by the driver by means of the brake or the service brake; furthermore, in this strategy, the assumption is that the vehicle can also be brought to a standstill by the driver when no gear is engaged in the transmission device during the freezing or when it is in a neutral position.

OBJECTS OF THE INVENTION

The object of the invention is to counteract, especially in a preventive manner, any situations that are critical in terms of safety during the operation of a motor vehicle that has an electronic control unit by means of which at least one drivetrain part is triggered.

According to a special aspect, the object of the invention is to provide a method for controlling a motor vehicle drivetrain system by means of which one can counteract situations that are critical in terms of safety, especially in a preventive manner. According to a special aspect, the object of the invention is to provide a safety system for a motor vehicle by means of which one can counteract situations that are critical in terms of safety, especially in a preventive manner. According to a special aspect, the object of the invention is to create a motor vehicle with a drivetrain system by means of which one can counteract situations that are critical in terms of safety, especially in a preventive manner.

SUMMARY OF THE INVENTION

The invention proposes especially a method for controlling a motor vehicle drivetrain system, which motor vehicle drivetrain system has a drivetrain as well as a combustion engine for driving this drivetrain and which motor vehicle drivetrain system furthermore has an electronic engine control unit that controls the internal combustion engine as well as an electronic transmission control unit for controlling at least one device arranged in the drivetrain, that is, a torque transmission device and/or gearbox device where the electronic engine control unit has a signal output to which is connected a signal transmission link and where the electronic engine control unit via this signal output and this signal transmission link, at least when the electronic engine control unit as well as the signal transmission link are functioning properly, will transmit signals during operation, which signals can be acquired by the electronic engine control unit and where the electronic engine control unit on the basis of the signals actually picked up by the electronic engine control unit will determine whether there is a functional impairment in the unit made up of the device arranged in the drivetrain, that is to say, the torque transmission device and/or the gearbox device and the electronic transmission control unit and the signal transmission link, where the electronic engine control unit limits the maximum permissible engine torque of the combustion engine when it has determined a functional impairment.

In a preferred embodiment, it is provided that the electronic transmission control unit will transmit the signals that it sends out to a CAN bus or a CAN bus system. In a particularly preferred manner, it is provided here that the electronic engine control unit can interrogate such signals in the CAN bus system or that it interrogates them or that such signals are passed on to the electronic engine control unit. A direct signal connection between the electronic transmission control unit and the electronic engine control unit is also preferred.

It is furthermore preferred that the electronic engine control unit will only determine whether there is a functional impairment of the device arranged in the drivetrain, that is to say, the torque transmission device and/or the gearbox device, and that when a functional impairment is detected, it will limit the maximum permissible engine torque.

It is furthermore preferred that the electronic engine control unit only determines whether there is a functional impairment of the torque transmission device—if any—in the drivetrain and that, if a functional impairment is detected, it will limit the maximum permissible engine torque.

It is furthermore preferred that the electronic engine control unit determined only whether there is a functional impairment in the gearbox device arranged in the drivetrain and that, when a functional impairment is detected, it limit the maximum permissible engine torque.

It is furthermore preferred that the electronic engine control unit determine only whether there is a functional impairment of the electronic transmission control unit and that, when a functional impairment is detected, it limit the maximum permissible engine torque.

It is furthermore preferred that the electronic engine control unit determine only whether there is a functional impairment in the communication or data communication or signal communication between the electronic engine control unit and the electronic transmission control unit or the parts that make the former possible such as, for example, an electronic transmission control unit and a signal transmission link, and that it limit the maximum permissible engine torque when a functional impairment is detected.

That the electronic engine control unit on the basis of the signals actually picked up by the electronic engine control unit determines whether there is a functional impairment of the kind mentioned or one or several of the mentioned types is provided in a preferred embodiment in such a manner that the electronic engine control unit during this determination can establish or can also establish that it does not pick up predetermined signals. This can happen, for example, in such a way that the electronic engine control unit determines whether the electronic transmission control unit has transmitted predetermined signals, such as signals that indicate operating characteristics or contain information about the control activities of the electronic transmission control unit, on CAN or to the CAN bus system, and when it does not establish that these signals were not transmitted by the electronic transmission control unit on CAN or to the CAN bus system or were not sent within a predetermined of time, it establishes that there is indeed a functional impairment or that the electronic transmission control unit has failed or that the communication or data communication or signal communication between the electronic transmission control unit and the electronic engine control unit has failed or that its function is impaired. In a preferred design, it is provided here that the electronic engine control unit reads in or tries to read in the corresponding signals from the CAN bus. The act of determining "on the basis" of the actually acquired signals thus need not mean that signals actually reached the electronic engine control unit or that they were read in there or that the quantity of the actually acquired signals is a quantity different from an empty quantity; instead, it is provided in a preferred manner that one can determine by means of or on the basis of the acquired signals (also) that signals were not acquired or which signals were not acquired or were not read into the electronic engine control unit or did not reach the electronic engine control unit, and in a preferred version from this non-acquisition or non-read-in or non-reaching, one can draw conclusions as to the existence of a corresponding functional impairment.

It is also preferred that the electronic engine control unit, on the basis of signal information that displays a signal that actually reached the electronic engine control unit or that was acquired by it or that was read into the electronic engine control unit, determine whether there is a functional impairment. For example, it can be provided that such a signal is a signal transmitted by the electronic transmission control unit that indicates whether there is a functional impairment and/or which functional impairment exists in the torque transmission device; it can also be provided, for example, that such a signal is a signal transmitted by the electronic transmission control unit that indicates whether there is a functional impairment or what kind of functional impairment there is in the clutch device; it can also be provided, for example, that such a signal is an alive counter or an alive counter signal or function signal that, if the electronic transmission control unit and/or the signal transmission link are properly functioning, is constantly altered by the electronic transmission control unit, for example, at time intervals of 10 msec or the like, where the change, for example, can be such that this signal displays a value and that this value is raised every 10 msec in a predetermined manner by, for instance, the value of "one" and possibly upon reaching a maximum value once again starts counting from "zero" and where the electronic engine control unit reads this signal in—especially continually—and checks to see whether this signal changes in the predetermined manner and, if there is no change of the kind mentioned, concludes that the electronic transmission control unit has failed and/or that this signal transmission link has failed or that its function is impaired. The combination of these examples in any desired fashion is also particularly preferred.

According to the invention, there is proposed in particular a method for controlling a motor vehicle drivetrain system, which motor vehicle drivetrain system has a gearbox device arranged in a drivetrain and/or at least one torque transmission device arranged in the drivetrain, where the motor vehicle drivetrain system furthermore has a combustion engine for driving the drivetrain as well as an electronic engine control unit that controls the combustion engine and an electronic transmission control unit for controlling the gearbox device and/or at least one torque transmission device, whereby it is determined whether between the electronic transmission control unit and the electronic engine control unit there is a data or signal communication or there is a functioning data or signal communication and/or where it is determined whether the electronic transmission control unit has a functional impairment and/or where it is determined whether the gearbox device and/or the torque transmission device has a functional impairment where the maximum permissible engine torque of the combustion engine is limited when it is established that there is no data or signal communication and/or that there is a functionally impaired data or signal communication between the electronic transmission control unit and the electronic engine control unit and/or that the maximum permissible engine torque of the combustion engine is limited when it is determined that the electronic transmission control unit has a functional impairment and/or when the maximum permissible engine torque of the combustion engine is limited when it is determined that the gearbox device and/or the torque transmission device display a functional impairment.

In a preferred version, the maximum permissible engine torque is limited when it is ascertained or established that there is no data or signal communication and/or that there is a functionally impaired data or signal communication between the electronic transmission control unit and the electronic engine control unit.

In a preferred embodiment, the maximum permissible engine torque is limited when it is ascertained or established that the electronic transmission control unit is functionally impaired.

In a preferred embodiment, the maximum permissible engine torque is limited when it is ascertained or established that there is a functional impairment in the gearbox device and/or in the torque transmission device.

According to the invention, a method is proposed in particular for the control of a motor vehicle drivetrain system, which motor vehicle drivetrain system has a gearbox device arranged in a drivetrain and/or at least one torque transmission device arranged in the drivetrain, where the motor vehicle drivetrain system furthermore has a combustion engine for driving the drivetrain as well as an electronic engine control unit that controls the combustion engine and an electronic transmission control unit for controlling the gearbox device and/or at least one torque transmission device, whereby it is determined whether between the electronic transmission control unit and the electronic engine control unit there is a data or signal communication or there is a functioning data or signal communication and/or where it is determined whether the electronic transmission control unit has a functional impairment and/or where it is determined whether the gearbox device and/or the torque transmission device has a functional impairment where the combustion engine is shut off when it is established that there is no data or signal communication and/or that there is a functionally impaired data or signal communication between the electronic transmission control unit and the electronic engine control unit and/or that the combustion engine is shut off when it is determined that the electronic transmission control unit has a functional impairment and/or when the combustion engine is shut off when it is determined that the gearbox device and/or the torque transmission device displays a functional impairment and when in each particular case it is additionally ascertained that the motor vehicle's brake is activated and/or when in each case it is also established that the vehicle speed is slower than a predetermined speed limit and/or when it is established, in addition, that the engine speed is less than a predetermined limit and/or when it is established, in addition, that the idle controller torque is greater than a predetermined boundary value and/or when it is additionally established that a selection lever, which can be actuated by the driver, is neither in the park position nor in the neutral position.

According to this embodiment, in other words, the combustion engine is not shut off already when it is ascertained or determined that there is no data or signal communication or that there is functionally impaired data or signal communication between the electronic transmission control unit and the electronic engine control unit and/or when it is ascertained or determined that there is a functional impairment in the gearbox device and/or in the torque transmission device; instead, this applies when it is additionally ascertained or determined that other conditions have been met. To simplify the illustration, these additional conditions hereafter will be referred to as "additional shutoff conditions," where the condition to the effect that "the motor vehicle's brake has been actuated" will be referred to as "first additional shutoff condition," where the condition to the effect that "the vehicle speed is less than a predetermined speed limit" is referred to as "second additional shutoff condition," where the condition to the effect that "the engine speed is less than predetermined limit" is referred to as "third additional shutoff condition," where the condition to the effect that "the idle controller torque is greater than a predetermined boundary value" is referred to as "fourth additional shutoff unit" and where the condition to the effect that "a selection lever that can be actuated by the driver is neither in the park position nor in the neutral position" is referred to as "fifth additional shutoff unit."

In a preferred embodiment, the combustion engine is shut off when it is ascertained or determined that there is no data or signal communication or that there is a functionally impaired data or signal communication between the electronic transmission control unit and the electronic engine control unit and when it is determined or established that additional shutoff conditions or predetermined additional shutoff conditions have been met. The combustion engine is preferably shut off in that it shuts itself off.

In a preferred embodiment, the combustion engine is shut off when it is ascertained or established that the electronic transmission control unit displays a functional impairment and when it is ascertained or established that additional shutoff conditions or predetermined additional shutoff conditions have been met.

In a preferred embodiment, the combustion engine is shut off when it is ascertained or determined that there is a functional impairment in the gearbox device and/or in the torque transmission device and when it is determined or ascertained that additional shutoff conditions or predetermined additional shutoff conditions have been met.

The previously mentioned additional shutoff conditions are in each case in preferred embodiments a combination of the first to the fifth shutoff conditions such as, for example, first to fifth shutoff condition or first to fourth shutoff condition or first to third shutoff condition or first to second shutoff condition or first shutoff condition or second to fifth shutoff condition or second to fourth shutoff condition or second to third shutoff condition or second shutoff condition or third to fifth shutoff condition or third and fourth shutoff condition or third shutoff condition or fourth and fifth shutoff condition or fourth shutoff condition or fifth shutoff condition.

According to the invention, a method is proposed in a particularly preferred manner for controlling a motor vehicle drivetrain system that has a drivetrain that can be loaded by means of a combustion engine as well as an electronic engine control unit for controlling the combustion engine and an electronic transmission control unit where the electronic engine control unit by means of a predetermined characteristic determines whether it has lost communication with the electronic transmission control unit and where the electronic engine control unit limits the maximum permissible engine torque when it has ascertained that it has lost communication with the electronic transmission control unit. As an alternative, it can also be provided that the electronic engine control unit, in place of the steps relating to communication by means of a predetermined characteristic, determines whether the electronic transmission control unit has failed, while the electronic engine control unit limits the maximum permissible engine torque when it ascertains that the electronic transmission control unit has failed. The combination of both of these embodiments is also preferred.

In a preferred manner in this particular embodiment or in these embodiments, the combustion engine shuts itself off or shuts itself off by means of the electronic engine control unit when the electronic engine control unit ascertains that it has lost communication with the electronic transmission control unit and when it is ascertained additionally that the mentioned additional shutoff conditions, which, for example, are used in the combinations mentioned by way of example, are met. The communication preferably is a data or signal communication.

The particular device or the device arranged in the drivetrain for whose triggering the transmission control unit is provided preferably has a torque transmission device and/or a gearbox device or is such a device.

A torque transmission device in terms of the invention preferably has a clutch device or is a clutch device. According to a particularly preferred embodiment, the torque transmission device has a starting clutch for the motor vehicle or is such a device. One can also provide several starting clutches, and a transmission control unit is provided to trigger them. According to a particularly preferred embodiment, the clutch device or the starting clutch device is made in the form of a friction clutch device. The torque transmission device or the clutch device or the starting clutch device in a particularly preferred embodiment displays an actuation device by means of which the clutch (device) or the torque transmission device can be actuated. Such an actuation device, which is also referred to as a clutch actuation device, can have, for example, mechanical and/or hydraulic and/or pneumatic and/or electronic components. It is furthermore preferred that the gearbox device have an actuation device that is also referred to as gearbox actuation device, which, for example, has mechanical and/or hydraulic and/or pneumatic and/or electronic components. In a particularly preferred embodiment, it is determined according to the invention whether the clutch activation device and/or the gear activation device are functionally impaired when it is determined whether the torque transmission device or the clutch device or the gearbox device is functionally impaired. Such a functional impairment, for example, can be of such a nature that the position of the clutch actuation device or the gearbox actuation device cannot be altered, something that in a preferred embodiment is indicated by the electronic transmission control unit by means of a signal.

In a particularly preferred manner, it is provided that the electronic engine control unit by means of such signal information then establishes that the clutch device or the gearbox device is functionally impaired.

A clutch device in the context of this invention preferably is an electronically controlled clutch device. In a preferred embodiment, it can be provided that the starting clutch or the starting clutches are controlled by means of the electronic transmission control unit.

In a preferred embodiment, a functional impairment is represented by a failure. A functional impairment in a preferred embodiment is a malfunction in the form of a failure.

It is provided in a preferred manner that the transmission control unit transmits predetermined signals in order to indicate that it is functional or that it indicates its functionality by means of such signals. Such signals are also referred to as function signals. Such function signals, for example, can be a signal or signals that will change or are changed by the transmission control unit in a predetermined manner. For example, such a signal can represent a number and can be altered such that this number will change. Here is an example: A function signal or function signals are transmitted by the transmission control unit, for example, at predetermined time intervals, and represent numerical values that are clicked up or down on the counter. It can be provided, for instance, that the electronic transmission control unit every 10 msec transmits such a function signal that represents a number and the particular following function signal represents a number that is increased by "one" with respect to the preceding signal. It can also be provided that this kind of up-clicking continues up to a maximum value and that, after the maximum value has been reached, one starts all over again with the starting value which, for instance, is "zero."

In a particularly preferred embodiment, the electronic transmission control unit transmits such function signals on CAN or to a CAN bus system.

In a preferred embodiment, it is provided that—preferably the electronic engine control unit—will determine whether these function signals are actually supplied or transmitted by the electronic transmission control unit and/or whether they are altered in a predetermined fashion. If in the process it is ascertained that these signals are not transmitted or supplied or not in the predetermined manner, then one preferably can conclude that the data or signal communication between the electronic transmission control unit and the electronic engine control unit is functionally impaired or has failed or that the electronic transmission control unit and/or the signal transmission link is functionally impaired and/or has failed. Here one can provide, for example, that the electronic transmission control unit transmits or is supposed to transmit the function signals on CAN or to a CAN bus system and that the electronic engine control unit determines whether these function signals are present on CAN or in the CAN bus system and/or are altered in the predetermined manner and—if this is not the case—draws the conclusion that the data or signal communication between the electronic transmission control unit and the electronic engine control unit has failed or is functionally impaired or that the electronic transmission control unit and/or the signal transmission link is functionally impaired and/or has failed.

According to a particularly preferred embodiment, a missing communication or data or signal communication between the electronic engine control unit and the electronic transmission control unit is ascertained when it is found that an alive counter is not increased or is no longer correctly increased by the transmission control unit.

In a particularly preferred manner, the alive counter is a CAN message or a signal transmitted to the CAN bus system that is altered in a predetermined manner. In a particularly preferred manner, this signal or this message is transmitted or altered by the electronic transmission control unit. Preferably, the signal or the message represents a number and is altered such that this number will change. According to a particularly preferred embodiment, this signal or this message—or the particular number represented by it—is altered at predetermined, for example, constant time intervals by a predetermined value that, for example, can be constant. In particular, it can be provided that the number is increased each time at predetermined time intervals. It can also be provided that such a number is increased at predetermined time intervals and that, upon reaching a maximum value, one starts again counting from the lowest value. These signals or messages are preferably transmitted when communication or signal communication or data communication between the electronic transmission control unit and the electronic engine control unit is present or is functional, while, when these signals or messages fail to materialize or when the change or increase is not accomplished in the predetermined manner, one ascertains that the communication or the signal communication or the data communication between the electronic transmission control unit and the electronic engine control unit does not exist or that its function is impaired.

It is provided in a particularly preferred manner that the alive counter is a CAN message or a signal transmitted to the CAN bus system that is increased or must be increased or should be increased every 10 msec by "one," and after reaching a maximum value such as, for example, 4, it flips so that the count starts all over again—for example, at zero or 1. Such numbers and such time intervals can also have other values. It can be provided, for example, that the electronic engine control unit determines whether on CAN or in the CAN bus system there are accordingly altered signals or messages, and when this is not the case, it ascertains that communication or data or signal communication between the electronic engine control unit and the electronic transmission control unit is functionally impaired, is not present or is jammed. Here it can be provided, for example, that the electronic engine control unit at the same time intervals at which the particular signal or the particular message is supposed to be changed will perform a corresponding interrogation or will read in a corresponding signal from CAN or from the CAN bus system; it can also be provided that these time intervals are longer than those by which the signal or the message is supposed to be altered in each case. For example, it can be provided that it is determined in the electronic engine control unit by what value the signal or the message or the number represented by it should have been changed since the last interrogation or determination and that one thereafter checks whether this change actually exists. In the example mentioned, where the signal or the message or the number represented by it is to be increased every 10 msec by "one" and, for example, is clicked up to "four" and where one then again starts over from "zero" in order to click back up again, it can, for example, also be provided that the electronic engine control unit will check every 20 msec whether the value has been increased by "two," where a "flipover" can be considered in those exemplary embodiments where this flipover of the counter, in other words, a renewed start from a starting value such as zero takes place after reaching a maximum value, such as "four."

In a particularly preferred manner, the electronic engine control unit will check whether there is a change at time intervals that are greater than or equal to the time intervals at which the signal or the message is to be altered in a preferred manner.

Preferably, it is ascertained that a functionally impaired communication or no communication exists between the transmission control unit and the CAN bus system or between the transmission control unit and the electronic engine control unit when no further CAN message or no further CAN signals are transmitted from the electronic transmission control unit or when the electronic engine control unit no longer transmits signals to the CAN bus system. Such signals or messages are preferably those that indicate predetermined operating characteristics. These can, for instance, be operating characteristics of a clutch device, such as the position of the clutch device or a torque that can be transmitted by the clutch device or the like, and/or of a gearbox device, such as a gear that has been engaged, or the position of the transmission actuation system or the like. In a particularly preferred manner, it is provided that those signals be transmitted from the electronic transmission control unit to the CAN bus system or to CAN in case of trouble-free operation when communication or signal communication or data communication between the electronic engine control unit and the electronic transmission control unit is present or is properly functioning and when the signal transmission link is properly functioning and when the electronic transmission control unit is properly functioning. In a preferred manner, it is provided that the electronic engine control unit determines whether such signals were transmitted within predetermined time windows from the electronic transmission control unit on CAN or to the CAN bus system and it ascertains in a particularly preferred manner that no signals were transmitted from the electronic transmission control unit to the CAN bus when this was not ascertained within such time windows.

In a preferred manner, the electronic engine control system determines whether such signals or messages were transmitted or are transmitted to the CAN bus system. For example, the electronic engine control system determines this in particularly predetermined time windows.

According to a preferred embodiment, it is determined whether signals or messages that were transmitted or are to be transmitted from the electronic transmission control unit to the CAN bus system are so altered that it is indicated that the operating characteristics have changed. If it is then ascertained that the predetermined operating characteristics have not changed, preferably within a period of time that is longer than a predetermined period of time, then it is ascertained preferably that the signal connection or the communication or the signal communication or the data communication between the electronic engine control unit and the electronic transmission control unit or the electronic transmission control unit and the CAN bus system is functionally impaired, in particular, that it has failed; in a preferred embodiment, it is provided that—as an alternative or as a supplement—it is then ascertained that the electronic transmission control unit and/or the signal transmission link is functionally impaired, in particular, it has failed.

If this determination is made where one establishes whether signals displayed from the transmission control unit indicate that certain operating characteristics have changed or that they have changed in a predetermined period of time, one preferably uses empirical values or miscellaneous information on whose basis one can then conclude that such operating characteristics should have changed within a predetermined period of time. In particular, one can perform a plausibility test here. Such a plausibility test, for example, can also be performed on the basis of data or parameters that are possibly stored in the engine control unit. For example, in a system with precisely one starting clutch, it can be provided that when the electronic transmission control unit displays for a longer period of time that a starting clutch is disengaged and when at the same time the information is supplied that the engine torque definitely existed above the engine idling torque during that period of time, one can draw the conclusion that the information regarding the position of the clutch is faulty; that, of course, should not be construed to mean that this special preferred routine must also prevail in all invention-based embodiments where precisely one starting clutch is present.

Preferably, the maximum permissible engine torque is limited to a value that is greater than "zero." It is furthermore preferred that the maximum permissible engine torque be confined to "zero," and in that way, one can in a particularly preferred manner make sure that the combustion engine will be shut off, especially automatically.

Preferably, an engine torque limit is used to limit the maximum permissible engine torque. Such an engine torque boundary for the maximum permissible engine torque in particular is an (upper) boundary or barrier according to which—especially when it is set—the maximum permissible engine torque is limited. In a preferred manner, it is provided that an engine torque boundary be set in order to limit the maximum permissible engine torque; such a set engine torque boundary is preferably devised according to a possible embodiment of an engine torque boundary described in this disclosure.

The engine torque boundary, for example, can be a torque value that is less than 400 Nm and/or that is between 0 Nm and 180 Nm and/or between 20 Nm and 160 and/or between 40 Nm and 140 Nm and/or between 60 Nm and 120 Nm and/or between 80 Nm and 120 Nm; in a preferred embodiment, it is provided, for example, that the maximum permissible engine torque be limited to 100 Nm or that the engine torque boundary is 100 Nm. Preferably, it is provided that this engine torque boundary always allows the driver to stop and/or to stall the motor vehicle by means of the brake, especially the service brake, or that this engine torque boundary is set such that this stalling or stopping is always possible. Values for the engine torque boundary other than those given are also preferred. It is provided in a preferred manner that this engine torque boundary always be equal and/or constant. For example, it can be provided that precisely a constant equal value be stored as engine torque boundary.

Preferably, one uses various engine torque boundaries to limit the maximum permissible engine torque. For example, it can be provided that a currently set engine torque boundary is selected from several engine torque boundaries, and in this context in a particularly preferred manner, one employs predetermined selection criteria. According to a particularly preferred embodiment, it is provided that the set engine torque boundary is selected or determined as a function of the gas pedal position of the motor vehicle or of a motor vehicle. For instance, this is arranged such that a first engine torque boundary be set when the gas pedal of a motor vehicle is actuated and that a second, preferably lesser [engine torque boundary] be set when it is not actuated.

The engine torque boundary or the particular currently set engine torque boundary can be a value that is always the same for the particular motor vehicle and that is preferably stored; the engine torque boundary or the particular currently set engine torque boundary can also depend on predetermined situations or operating characteristics. For example, it can be provided that the engine torque boundary or the set engine torque boundary will be a function of the gas pedal position. The engine torque boundary for the maximum permissible engine torque can preferably also be a functional interrelationship. Preferably, for example, the engine torque boundary for the maximum permissible engine torque is a function of the time that, starting from a determined (start) value for the maximum permissible engine torque, increasingly reduces the maximum permissible engine torque as the time increases.

Preferably, an engine torque boundary is entered or selected or determined for the maximum permissible engine torque as a function of an input by the driver of the motor vehicle in the electronic engine control unit. This input or such an input is indicated in a preferred embodiment via the gas pedal position of a motor vehicle to the electronic engine control unit. According to a preferred embodiment, it is provided that the engine torque boundary for the maximum permissible engine torque be set when the gas pedal is not actuated at a value that is between 30 and 150 Nm and, when the gas pedal is actuated, at a value between 150 Nm and 300 Nm. The values can also different in another preferred embodiment.

In a particularly preferred manner, it is provided that the engine torque boundary be set at 200 Nm for the maximum permissible engine torque when the gas pedal is actuated and at 50 Nm when the gas pedal is not actuated. These values can also be different in other preferred embodiments.

Preferably, the maximum permissible engine torque is limited such that it is always possible to brake the motor vehicle to a standstill by means of a service brake of the motor vehicle or to stall the motor vehicle, in particular, when the clutch is engaged. Preferably, the motor vehicle or the combustion engine is stalled during this braking action to a standstill or braking.

To make stalling easier or to facilitate a controlled shutoff of the engine or the combustion engine, it is provided in a particularly preferred manner that this combustion engine can (also) turn itself off. This is done preferably by means of an embodiment where the mentioned additional shutoff conditions are used in one of the mentioned ways. It is also preferred that such a shutoff or self-shutoff of the combustion engine be brought about via a corresponding setting of the engine torque boundary for the maximum permissible engine torque, which, in this case, for example, is set at 0 Nm.

In a preferred embodiment, it is provided that a service brake of the motor vehicle be provided, which brake can generate a predetermined braking torque, and that the engine torque boundary for the maximum permissible engine torque be set at a value that depends on that braking torque.

Preferably, the engine torque boundary for the purpose of limiting the maximum permissible engine torque is set at a value which is such that, considering the overall gear ratio actually existing in the drivetrain or all of the (overall) gear ratios that can be set in the drivetrain or the maximum or minimum gear ratio that can be set in the drivetrain, in particular, the overall gear ratio, the braking torque or the maximum generable braking torque of the service brake will always suffice to stop or stall the motor vehicle.

It is provided in a particularly preferred manner that the engine torque boundary or the set engine torque boundary for the maximum permissible engine torque be set at a value that is less than or equal to the quotient from the braking torque that can be produced by the service brake and the actually existing or maximum or minimum gear ratio that can be set in the drivetrain between the engine output shaft and the driving axles of the motor vehicle. In a preferred embodiment, it is provided that specifically all gear ratios or overall gear ratios are considered which can be selected in the drivetrain so that one can make sure that regardless of the gear ratio that can be set, braking all the way to standstill or stalling the motor vehicle will still be possible.

In a preferred embodiment, a safety factor is provided in determining the engine torque boundary. It can be provided, for example, that the engine torque boundary for the maximum permissible engine torque be set at 0.5 times or 0.7 times or 0.8 times or 0.9 times the mentioned quotient. A safety factor, of course, can also be chosen in a different manner, for example, it can be chosen to be less than 0.5. In determining such a safety factor, one can, for instance, also consider the fact that the service brake possibly may be subject to wear and tear, which can mean that the braking torque that can be produced will decline.

In particular, it can be provided that the engine control unit limit or restrict the engine torque when the transmission control unit stops transmitting sensible signals (for exampling, the living counter is not updated, CAN signal or CAN message missing).

In a preferred embodiment, it is provided that the electronic engine control unit determines and/or predetermines and selects and/or sets the engine torque boundary for the maximum permissible engine torque. Preferably, the electronic engine control unit controls the combustion engine in such a manner that the engine torque will not exceed the engine torque boundary for the maximum permissible engine torque when this engine torque boundary is predetermined or set or when the maximum permissible engine torque is limited.

In a particularly preferred manner, one can electrically or electronically control or ensure that when the maximum permissible engine torque is limited, the current engine torque will not exceed the engine torque boundary or the set engine torque boundary.

In a preferred embodiment, it is provided that the transmission control unit has a main processor and that a redundant processor is provided with the main processor and the redundant processor mutually controlling each other and where the position of the gearbox actuation device and the clutch actuation device in a particular predetermined position, especially in a currently given position, will be held or frozen when the reciprocal control of the processors shows that the processor function of one of these processors is jammed. In particular, a so-called integrated safety monitoring system can be provided. It is particularly preferred that when the position of the gearbox actuation device and/or the clutch actuation device is frozen, that condition will be displayed to the electronic engine control unit where the electronic engine control unit then limits the maximum permissible engine torque, and/or preferably when predetermined additional shutoff conditions are met, turns off the combustion engine or causes the automatic shutoff of the combustion engine.

It is furthermore preferred that the maximum permissible engine torque be limited and/or that the combustion engine— for example, when predetermined additional shutoff conditions are met—is shut off when it is ascertained that a position of the gearbox actuation device and/or the clutch actuation device cannot be altered or cannot be changed in spite of appropriate triggering. In a preferred embodiment, it can also be provided that it is ascertained that a position of the gearbox actuation device and/or the clutch actuation device cannot be changed and, as a result or, among other things, as a result, a limitation of the maximum permissible engine torque or a shutoff of the combustion engine is brought about without there being on hand an embodiment with redundant processor or an integrated safety monitoring system or without there being any freezing of the position of the gearbox actuation device and/or the clutch actuation device by means of such an embodiment.

In a preferred embodiment, it is provided that at least when the engine torque or the maximum permissible engine torque is not limited according to the invention, the engine torque be regulated by means of an idle controller while the combustion engine is running such that the engine speed when in operation will correspond at least to the idle speed. Here it can be provided, for example, that the engine torque will be increased by means of the idle controller when the engine speed falls below the idle speed. It can then be provided, for example, that the idle controller with the drivetrain disengaged, in other words, especially when the starting clutch is disengaged or when the gearbox device is switched into "neutral," will control the engine torque in such a manner that the combustion engine will rotate at a predetermined idle speed or will not fall below that speed or, if at all possible, will not fall below it. For instance, it can be provided that the idle controller with the drivetrain disengaged will select an engine torque of 400 Nm in order to cause the combustion engine to rotate at the idle speed.

This value can also be different. Such an idle controller preferably is designed such that as the engine speed drops—something that may happen especially when the drivetrain is engaged or is in the process of being engaged—the engine torque is increased in order to prevent the engine speed from dropping below the idle speed or, in case of such a drop, the idles speed will again be raised to a higher value. It is preferably provided that an idle controller or such an idle controller at a maximum selects or brings about the limited maximum permissible engine torque or the maximum permissible engine torque corresponding to the set engine torque boundary when the maximum permissible engine torque is limited according to the invention or when an engine torque boundary is set for the maximum permissible engine torque.

According to the invention, there is furthermore provided a safety system for a motor vehicle where this safety system can receive, transmit and process electronic signals and has a memory device in which at least one control program is stored that can control or that does control an invention-based method.

The safety system preferably has an electronic engine control unit and this electronic engine control unit can receive, transmit and process electronic signals. It is furthermore provided in a preferred manner that this electronic engine control unit has a memory device in which the control program is stored, which program controls or can control an invention-based method.

According to the invention, there is furthermore provided especially a motor vehicle with a drivetrain system, which drivetrain system has a drivetrain that at the driving end is coupled to a combustion engine and that, when in operation, is loaded by said engine and that is coupled to the wheels of the motor vehicle on the power output side so that these wheels can be driven by means of the combustion engine, whereby in this drivetrain, there is arranged a gear that can be actuated by means of a gearbox actuation device and by means of which one can alter the gear ratio in the drivetrain between the combustion engine and the driven wheels, whereby at least one starting clutch that can be actuated by means of a clutch actuation device exists in the drivetrain and where the drivetrain system has an electronic engine control unit to control the combustion engine as well as an electronic transmission control unit to control the gearbox device or the gearbox actuation device and/or the starting clutch or the clutch actuation device, whereby a brake is provided for the purpose of braking the motor vehicle and where, furthermore, there is provided an idle controller which controls the combustion engine or a fuel metering element in operation in such a manner that the engine torque is increased when the engine speed drops below the idle speed in order to raise the engine speed to or above that idle speed and where the engine output as well as the selectable gear ratios of the drivetrain and the regulatory function of the idle controller are such that at least in case of a selectable gear ratio and with the drivetrain engaged, the engine torque could be raised to a value that is such that in case of this gear ratio, the braking torque of the brake would not suffice to bring about a deceleration of the vehicle, whereby, furthermore, there is provided an invention-based safety system by means of which one can ensure that this motor vehicle can be braked by means of this brake with the drivetrain engaged and with any gear ratio that can be selected in this drivetrain.

Regardless of what gear ratio has currently been selected in the transmission or which gear has been engaged there, this invention-based motor vehicle can be braked or stalled to a standstill also when the drivetrain is engaged or when the clutch is engaged.

Preferably, the idle controller or the functionality of the idle controller is integrated into the electronic engine control unit.

Preferably, it is provided that the safety system is also engaged in such a manner that this motor vehicle can be braked by means of this brake with the drivetrain engaged and with any selectable gear ratio when there is a functional impairment in the torque transmission device and/or in the gearbox device and/or when the electronic transmission control unit and/or a signal transmission link that adjoins the electronic transmission control unit has failed and/or when there is no data or signal communication or only a functionally impaired data or signal communication between the electronic transmission control unit and the electronic engine control unit.

Preferably, the gearbox device is an automated-control gearbox device, specifically in a preferred manner, it is an automated shift transmission (ASG) or a parallel shift transmission (PSG) or an uninterruptible shift transmission (USG).

Preferably, at least one starting clutch device is provided, which is made as an electronically controlled clutch device.

There are motor vehicles with high torque or engine torque (which can exist even in case of idle control) and low gear ratios (for example, with a narrow range for climbing up steep mountains) where it is difficult or impossible with conventional embodiments to stall the engine or the combustion engine by means of the brake, such as the service brake. By means of the invention-based embodiments, for example, one can preferably improve this situation (in particular, when the clutch is engaged and possibly frozen and when in the gearbox device a gear has been engaged and possibly is frozen there).

BRIEF DESCRIPTION OF THE DRAWINGS

In the following, we will discuss exemplary or preferred invention-based embodiments with reference to the figures, which, of course, do not in any way restrict the invention. In the drawing:

FIG. 1 is a diagram illustrating the steps involved in an exemplary invention-based method;

FIG. 2 is a diagram illustrating the steps involved in an exemplary invention-based method; and, FIG. 3 is a diagram illustrating an exemplary invention-based motor vehicle with an exemplary invention-based safety system.

DETAILED DESCRIPTION OF THE INVENTION

Figure 3:
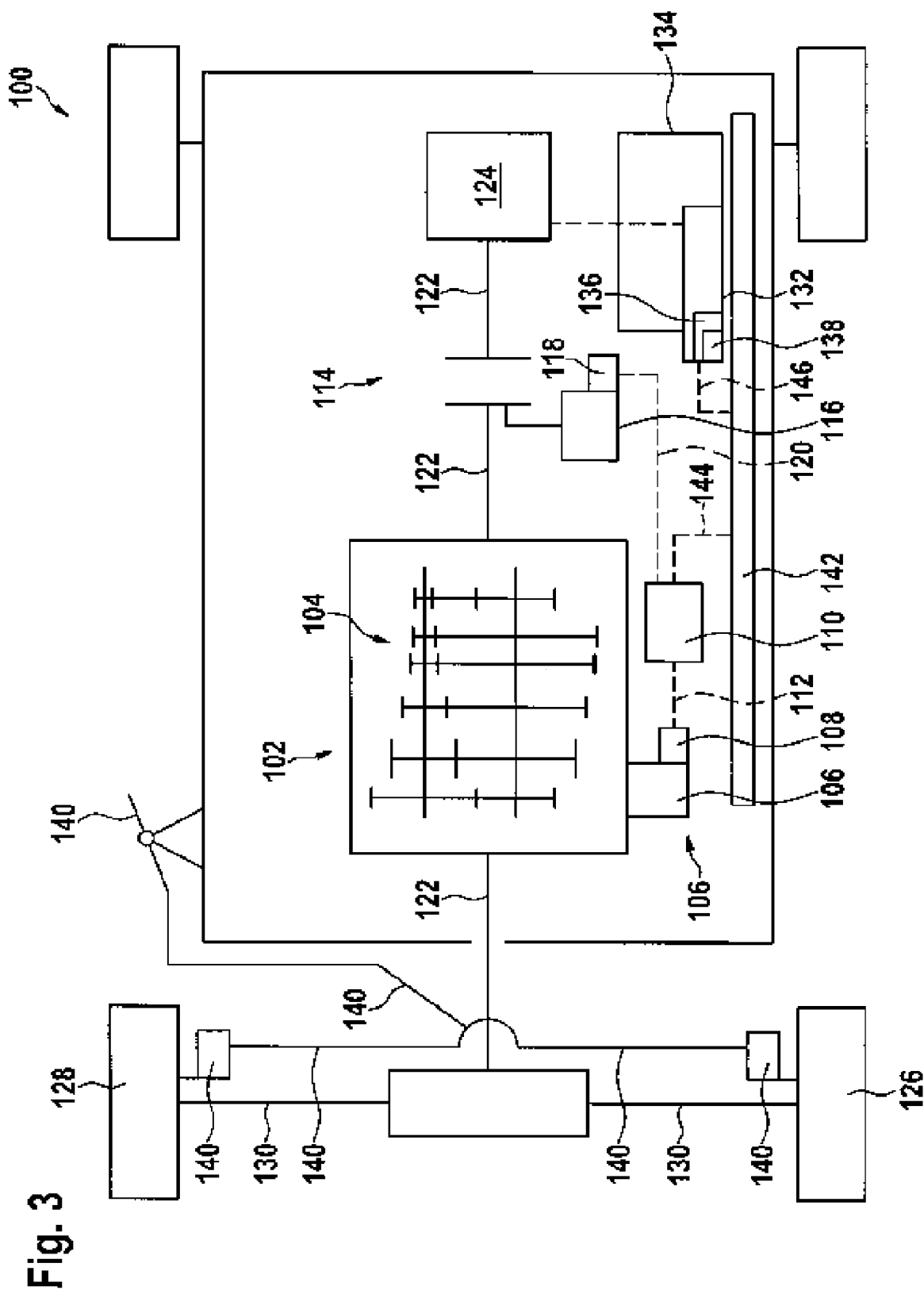

In step 10, we determined whether there is a communication or data communication or signal communication between an electronic engine control unit 132 of a motor vehicle 100 and an electronic transmission control unit 110 of that motor vehicle 100 or whether the electronic engine control unit 132 has lost communication or data communication or signal communication with the electronic transmission control unit 110 or whether such communication is missing.

A missing communication or data communication or signal communication, for example, is ascertained by or in that an alive counter is no longer correctly increased by the electronic transmission control unit 110. Such an alive counter, for example, can be a CAN message or a CAN signal or a signal transmitted from the electronic transmission control unit 110 on CAN or to a CAN system that must be or should be increased by 1 every 10 msec and where, when a maximum value is attained, for example, "four," it will flip so that the count will start again from the starting value, for example, "zero."

A missing communication or data communication or signal communication, for example—as an alternative or by way of supplementation—can also be ascertained by or in that no CAN messages or CAN signals or signals directed at a CAN bus system are transmitted from the electronic transmission control unit 110.

If it was ascertained in step 10 that the electronic engine control unit 132 has lost communication or data communication or signal communication with the electronic transmission control unit 110 or if such communication is missing, then the maximum permissible engine torque is limited in step 12.

This can be such that the maximum permissible engine torque will be limited to a predetermined value, for example, 100 Nm, and that the driver of vehicle 100 will then always be in a position to brake motor vehicle 100 by means of a brake 140 or by means of the service brake.

It can also be provided that various engine torque boundaries are used in accordance with the driver input into the electronic engine control unit 132. For example, it can be provided that the maximum permissible engine torque when the gas pedal is not depressed or actuated will be limited to 50 Nm and that it will be limited to 200 Nm when the gas pedal is depressed or actuated.

FIG. 2 shows a diagram illustrating the steps of an exemplary invention-based method.

In step 20, we determine whether a communication or no communication or data communication or signal communication exists between an electronic engine control unit 132 of a motor vehicle 100 and an electronic transmission control unit 110 of that motor vehicle 100 or whether the electronic engine control unit 132 has lost communication or data communication or signal communication with the electronic transmission control unit 110 or whether such communication does not exist or whether the electronic transmission control unit 110 has a defect. Step 20, for example, can be as step 10 in the embodiment according to FIG. 1.

In step 22, we determine whether the brake 140, especially the service brake of motor vehicle 100, is actuated.

In step 24, we determine whether the speed of motor vehicle 100 is less than predetermined speed limit. The speed limit can, for example, be 7 km/hr.

In step 26, we determine whether the engine speed is less than a predetermined limit. This predetermined limit, for example, can be 50 rpm below the idle speed and, for example, it can be 650 rpm.

In step 28, we determine whether the idle controller torque is greater than a predetermined boundary value. This boundary value, for example, can be 40 Nm or 400 Nm. This boundary value is not the engine torque boundary; instead, it is a boundary differing from it. But that does not mean ruling out the possibility that these different boundaries can be set at the same value.

In step 30, we determine whether a selection lever that can be actuated by the driver is neither in the park position (P) nor in the neutral position (N). Such selection levers with a park position (P) and a neutral position (N) are known and are used by way of example in automated shift transmissions. For example, in automated shift transmissions, it is provided as a rule that the selection lever of this type furthermore can be shifted into a position for automated forward drive (drive position (D)). One can also provide, for example, positions by means of which the driver by way of a kind of tilting motion can bump the gear to shift up or shift down, and in this case, the shifting is done in an automated fashion. Such a selection lever is actuated by the driver manually. The neutral position of the selection lever therefore must not be confused with a neutral position of the transmission, which, for example, in automated shift transmissions, one runs through when switching over between speeds and specifically, in particular, in an automated controlled fashion.

If the determination according to steps 20 to 30 shows that there is no communication or data communication or signal communication between the electronic engine control unit 132 and the electronic transmission control unit 110 and if the brake is actuated and if the speed of motor vehicle 100 is less than the predetermined speed limit and if the engine speed is less than the predetermined boundary and if the idle controller torque is greater than the predetermined boundary value and if the selection lever is not in the park position (P) or in the neutral position (N), then the combustion engine or engine is shut off in step 32.

One can check in any random sequence or in a parallel manner to see whether the conditions according to steps 20 to 30 have been met. This was explained above by way of example where diverse preferred combinations are mentioned according to which one can combine or use the first to the fifth switch-on conditions.

The automatic shutoff of the combustion engine, which can be performed especially in the prescribed manner, is preferably executed in order to make it easier to stall a motor vehicle or a combustion engine or to facilitate a controlled shutoff of the combustion engine or engine, specifically, for example, when a motor vehicle with the clutch engaged is to be braked or stalled to a standstill or when the electronic transmission control unit 110 has failed or when communication or data communication or signal communication of the electronic engine control unit 132 with the electronic transmission control unit 110 is absent and/or when the maximum permissible engine torque, as a result, is limited conditionally or is limited.

FIG. 3 shows a motor vehicle 100 with a gearbox device that is formed as automated-actuation transmission 102, such as an automated shift transmission (ASG). Various gears 104 can be selected in transmission 102. A gearbox actuation device 106 is provided, displaying a first electric motor 108 for the purpose of actuating transmission 102. The first electric motor 108 or the gearbox actuation device 106 or the transmission 102 is triggered by an electronic transmission control unit 110 that is indicated schematically by the broken line 112.

Furthermore, there is provided a torque transmission device that is formed as a starting clutch 114. This starting clutch 114 is a friction clutch and is made as electronically controlled clutch device. There is provided a clutch actuation device 116 by means of which the starting clutch 114 can be actuated, in particular, it can be disengaged and engaged and it can be shifted into positions in which the starting clutch 114 will slip or can transmit a limited torque. The clutch actuation device 116 has a second electric motor 118. This second electric motor 118 or the clutch actuation device 116 or the starting clutch 114 is controlled by the electronic transmission control unit 110, something that is indicated schematically by the broken line 120.

Gear 102 as well as starting clutch 114 are arranged in drivetrain 122 of the motor vehicle 100, which can be loaded by a combustion engine 124 in order to drive the drive axle or axles 130 provided with wheels 126, 128. The electronic engine control unit 132 is provided to trigger the combustion engine 124. The electronic engine control unit is a part of a safety system 134 and has a memory device 136 in which is stored a control program, and it is indicated schematically by the reference symbol 138. This control program 138 can control an invention-based method. This method, controlled by control program 138, is preferably such as was explained on the basis of FIG. 1. It is also preferred that this method, controlled by the control program 138 that is stored in memory device 136, is such as was explained earlier on the basis of FIG. 2. It can also be provided that the method, controlled by control program 138 stored in memory device 136, be a differently designed, invention-based method.

Motor vehicle 100 furthermore has a brake 140 by means of which one can generate or produce a braking torque and which can be fashioned as service brake.

A CAN bus system 142 is provided. As indicated schematically by broken line 144, the electronic transmission control unit 110 is in signal connection with the CAN bus system 142.

Broken line 146 indicates that the electronic engine control unit 132 is also in signal connection with the CAN bus system 142 or that there is a communication between the electronic engine control unit 132 and the CAN bus system 142.

The electronic transmission control unit 110 is in signal connection with the electronic engine control unit 132 via the signal link 144, the CAN bus system 142 as well as the signal link 146 or communication or data communication or signal communication is facilitated between the electronic transmission control unit 110 and the electronic engine control unit 132 via the signal link 144, the CAN bus system 142 as well as signal link 146. Such a signal link or communication can also exist directly between the electronic transmission control unit 110 and the electronic engine control unit 132 without the CAN bus system being in between.

LIST OF REFERENCE NUMBERS

10 Step
12 Step
20 Step
22 Step
24 Step
26 Step
28 Step
30 Step
32 Step
100 Motor vehicle
102 Transmission
104 Gears
106 Gearbox actuation device
108 Electric motor
110 Electronic transmission control unit
112 Broken line
114 Starting clutch
116 Clutch actuation device
118 Second electric motor
120 Broken line
122 Drivetrain
124 Combustion engine
126 Wheel
128 Wheel
130 Drive axle
132 Electronic engine control unit
134 Safety system
136 Memory device of 132
138 Control program
140 Brake
142 CAN bus system
144 Broken line (signal link)
146 Broken line (signal link).

What is claimed is:

1. A method for controlling a motor vehicle drivetrain system, which motor vehicle drivetrain system has a drivetrain (122) and a combustion engine (124) for the purpose of driving drivetrain (122) and which motor vehicle drivetrain system has an electronic engine control unit (132) that controls the combustion engine (124) and an electronic transmission control unit (110) for the purpose of controlling at least one of first or second torque transmission device (114, 116) or gearbox device (102, 106) where the electronic engine control unit (132) has a signal output connected to the transmission control unit (110), the signal output for transmitting signals to the transmission control unit (110), and a signal transmission link connected to the transmission control unit (110), the link for receiving signals from the transmission control unit (110), comprising: determining, using the electronic engine control unit (132) and the signals received or transmitted by the electronic engine control unit (132), whether there is a functional impairment in the first or second torque transmission device (114, 116) or, actuation device (106), or the electronic transmission control unit (110); and limiting, using the electronic engine control unit (132), maximum permissible engine torque of the combustion engine when the electronic engine control unit (132) has determined a functional impairment in the first or second torque transmission device (114, 116) or, the actuation device (106), or the electronic transmission control unit (110), wherein the second torque transmission device (116) is an electric motor.

2. A safety system for a motor vehicle (100), where the safety system can receive, transmit and process electronic signals and has a memory device (136) in which there is stored at least one control program (138) that controls a method according to claim 1.

3. The safety system according to claim 2, wherein the safety system (134) comprises an electronic engine control unit (132) and the electronic engine control unit (132) can receive, transmit and process electronic signals and has the memory device (136) in which there is stored at least the control program (138) that controls said method.

4. A motor vehicle with a drivetrain system, which drivetrain system has a drivetrain (122) coupled with a combustion engine (124) and when in operation is loaded by the combustion engine (124) and that on a power output side is coupled with wheels (126, 128) of the motor vehicle (100) so that wheels (126,128) can be driven by means of combustion engine (124), whereby in drivetrain (122) there is arranged a transmission (102) that can be actuated by means of a gearbox actuation device (106) by means of which a gear ratio given in the drivetrain (122) between the combustion engine (124) and the drivable wheels (126, 128) can be altered where, at least there is in the drivetrain (122) a starting clutch (114) that can be actuated by means of a clutch actuation device (116) and where the drivetrain system has an electronic engine control unit (132) for the purpose of controlling the combustion engine (124) and an electronic transmission control unit (110) to control the gearbox device (102, 106) or a gearbox actuation device (106) or the starting clutch (114) or clutch actuation device (116), whereby a brake (140) is provided for the purpose of braking the motor vehicle (100) where there is provided an idle controller that controls the combustion engine (124) or a fuel calculation member in operation in such a way that an engine torque is increased when an engine speed falls below an idle speed in order to raise the engine speed to or above that idle speed and where an engine output as well as selectable gear ratios of the drivetrain (122) and a regulatory function of the idle controller controlling the engine speed are such that when a gear ratio is selected and the drivetrain (122) is engaged, the engine torque could be raised to a value such that a braking torque of the brake (140) would not suffice to bring about a deceleration of the device (100), whereby, there is provided a safety system (134) according to claim 2, which ensures that motor vehicle (100) can be braked by means of brake (140) with the drivetrain (122) engaged and with each gear ratio that can be selected in drivetrain (122).

5. A method for controlling a motor vehicle drivetrain system, which motor vehicle drivetrain system has a gearbox device (102, 106) arranged in a drivetrain (122) or at least one torque transmission device (114) arranged in drivetrain (122) where the motor vehicle drivetrain system has a combustion engine (124) for the purpose of driving the drivetrain (122) as well as an electronic engine control unit (132) that controls the combustion engine (124) and an electronic transmission control unit (110) for the purpose of controlling the gearbox device (102, 106) or the at least one torque transmission device (114), comprising: determining whether the electronic transmission control unit (110), actuation device (106), or the torque transmission device (114) is functionally impaired; and limiting maximum permissible engine torque of the combustion engine (124) when it is determined that the electronic transmission control unit (110), the actuation device (106), or the torque transmission device (114) is functionally impaired, wherein the actuation device (106) is an electric motor.

6. The method according to claim 5, further comprising: determining by means of the electronic engine control unit (132) whether there is a data or signal communication or a functioning data or signal communication between the electronic transmission control unit (110) and the electronic engine control unit (132) or whether the electronic transmission control unit (110) is functionally impaired or whether the gearbox device (102, 106) or the torque transmission device (114) are functionally impaired or limiting the maximum permissible engine torque by means of the electronic engine control unit (132) or turning off the combustion engine (124) by means of the electronic engine control unit (132).

7. A method for controlling a motor vehicle drivetrain system, which motor vehicle drivetrain system has a gearbox device (102, 106) arranged in a drivetrain (122) or at least one torque transmission device (114) arranged in drivetrain (122) where the motor vehicle drivetrain system has a combustion engine (124) for the purpose of driving the drivetrain (122) as well as an electronic engine control unit (132) that controls the combustion engine (124) and an electronic transmission control unit (110) for the purpose of controlling the gearbox device (102, 106) or at least one torque transmission device (114), comprising: determining whether between the electronic transmission control unit (110) and the electronic engine control unit (132) there is a data or signal communication or there is a functioning data or signal communication or whether the electronic transmission control unit (110) is functionally impaired or whether the gearbox device (102, 106) or the torque transmission device (114) is functionally impaired; ascertaining a speed of the vehicle (100), a status of a brake (140) of the motor vehicle (100), torque for the idle controller, or a position for a selection lever that can be actuated by a driver of the vehicle; and, turning off the combustion engine (124) when it is determined that the electronic transmission control unit (110) is functionally impaired, or there is a functional impairment in the gearbox device (102, 106) or in the torque transmission device (114) and when it is ascertained that the brake (140) of motor vehicle (100) is actuated, or the vehicle speed is less than a predetermined speed limit, or the engine speed is less than a predetermined boundary, or the idle controller torque is greater than a predetermined boundary value, or the selection lever is neither in the park position nor in the neutral position.

8. The method according to claim 7, further comprising: determining by means of the electronic engine control unit (132) whether there is a data or signal communication or a functioning data or signal communication between the electronic transmission control unit (110) and the electronic engine control unit (132) or whether the electronic transmission control unit (110) is functionally impaired or whether the gearbox device (102, 106) or the torque transmission device (114) are functionally impaired; or limiting the maximum permissible engine torque by means of the electronic engine control unit (132); or turning off the combustion engine (124) by means of the electronic engine control unit (132).

* * * * *